Sept. 2, 1958 V. R. GERSMEHL, SR 2,850,117
WHEEL WEDGE CHOCK
Filed Dec. 20, 1955
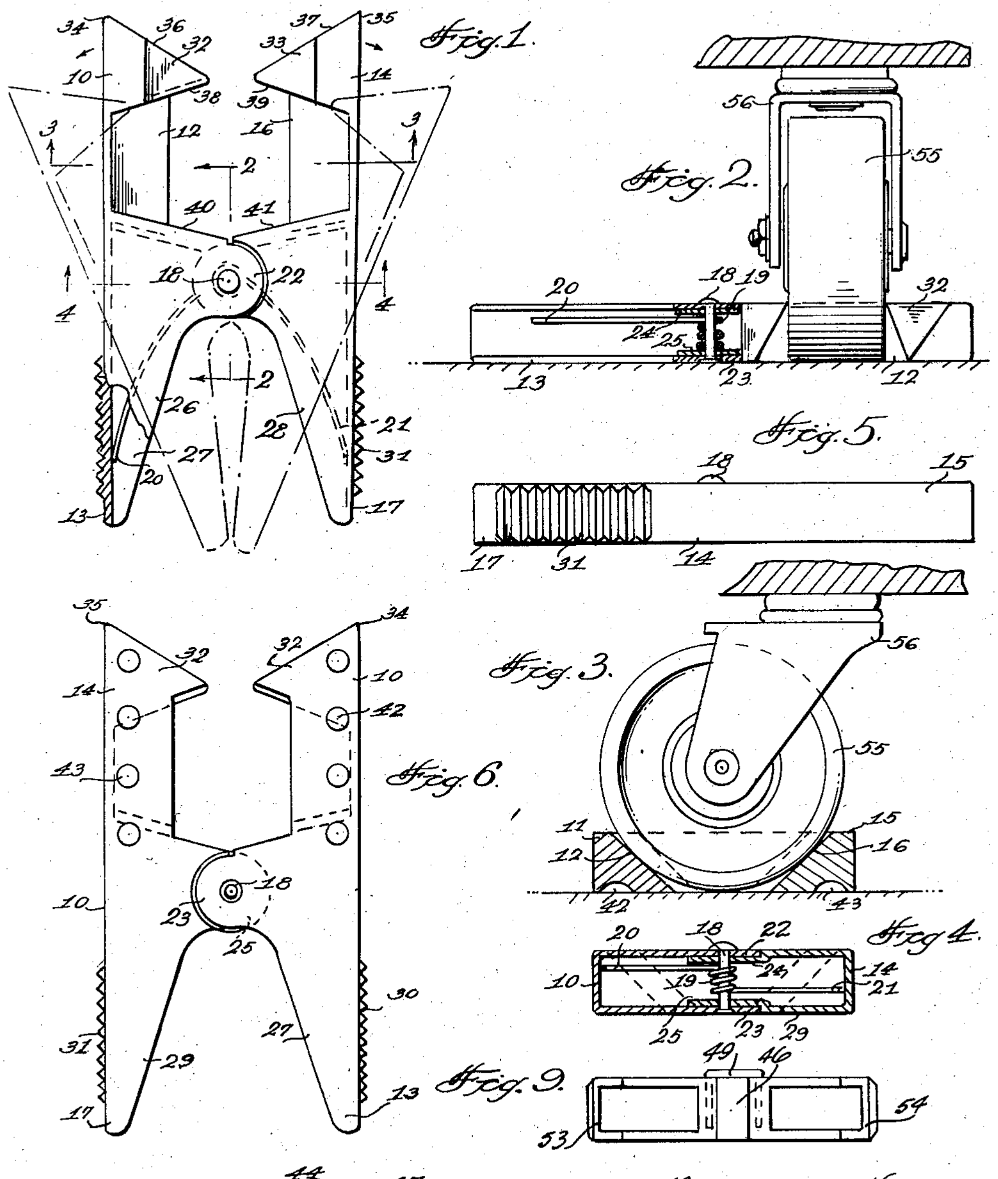
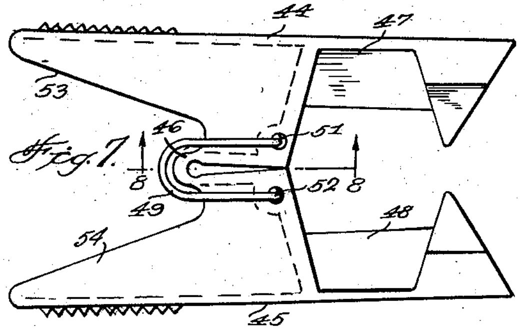
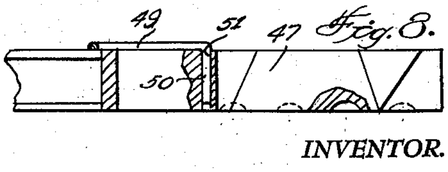
INVENTOR.
VERN R. GERSMEHL, SR.
BY Victor J. Evans & Co.
ATTORNEYS United States Patent Office 2,850,117

Patented Sept. 2, 1958

2,850,117

WHEEL WEDGE CHOCK

Vern R. Gersmehl, Sr., Cheyenne, Wyo.

Application December 20, 1955, Serial No. 554,365

4 Claims. (Cl. 188—32)

This invention relates to retaining devices particularly adapted for maintaining washing machines, furniture, and other similar articles or devices mounted on casters in desired positions, and in particular a pair of pivotally connected wedge-like spring actuated wheel holding members adapted to be positioned to receive a roller of a caster wherein with the members urged against the roller by the spring rollers of casters are definitely anchored in position and washing machines or other devices are secured in position.

The purpose of this invention is to provide a chock that is adapted to be positioned around a roller of a caster to prevent accidental movement of the caster.

In numerous instances wedges have been used to prevent casters of washing machines, furniture, and the like being moved accidentally by vibrations or accidental engagement of the machine by another machine or other devices and although wedges may be used on both sides of the roller the wedges are not connected and are readily separated and with continuous working of a machine a limited movement of the machine or other article is possible. With this thought in mind this invention contemplates a chock formed with pivotally connected wedge-like elements in which the elements are resiliently urged into gripping relation with a roller whereby accidental displacement of the elements is substantially impossible.

The object of this invention is, therefore, to provide a chock particularly adapted for casters in which a pair of spring actuated wheel holding members may readily be positioned on opposite sides of a roller of a caster with the members held by the thumb and fingers of one hand whereby upon release thereof the members snap into gripping relation with the peripheral surface of the roller or wheel.

Another object of the invention is to provide a chock for casters in which wedge-like wheel holding members are continuously urged against opposite sides of the roller of a caster whereby play of wear in the parts is readily taken up by spring means therein.

Another important object of the invention is to provide a spring actuated chock particularly adapted for wheels or rollers of casters in which wheel holding members of the chock are resiliently actuated so that the members are adapted to be used in combination with rollers or wheels of different diameters.

A further object of the invention is to provide a chock for rollers of casters wherein spring actuated pivotally connected wheel holding members are urged into operative positions of the roller or wheel of a caster in which the device is of a simple and economical construction.

With these and other objects and advantages in view the invention embodies a pair of wheel holding members having inclined or wedge-like surfaces with thumb and finger gripping handles extended from the members and with means for pivotally connecting the members at points between the wedge-like surfaces and handles.

Other features and advantages of the invention will appear from the following description taken in connection with the drawing, wherein:

Figure 1 is a plan view of the improved chock with part of a handle of one of the wheel holding members of the chock broken away, showing the members in operative positions in full lines and in positions in which the members are applied to a caster in broken lines.

Figure 2 is a longitudinal section through the chock taken on line 2—2 of Fig. 1 showing a caster positioned between the wheel holding members of the chock.

Figure 3 is a cross section through the wedge-like portion of the wheel holding members taken on line 3—3 of Fig. 1 also showing a caster roller positioned between the members.

Figure 4 is a cross section through the hinge or pivotal connection of the wheel holding members being taken on line 4—4 of Fig. 1.

Figure 5 is a side elevational view looking toward the outside of one of the wheel holding members of the device.

Figure 6 is a view looking upwardly toward the under surface of a chock.

Figure 7 is a plan view of the chock illustrating a modification wherein the wheel holding members are integrally connected and in which the members are resiliently urged into gripping relation with a roller with a U-shaped spring.

Figure 8 is a longitudinal section through the chock shown in Fig. 7 being taken on line 8—8 thereof.

Figure 9 is an end elevational view of the chock shown in Figs. 7 and 8 looking toward the ends of the handles of the chock.

Referring now to the drawing wherein like reference characters denote corresponding parts the improved chock of this invention includes a wheel holding member 10 having a wedge-like section 11 with an inclined surface 12 thereon positioned at one end and a handle 13 at the other, a similar wheel holding member 14 having a wedge-like section 15 with an inclined surface 16 on one end and a handle 17 on the other, a pin 18 pivotally connecting the members and a spring 19 coiled around the pin 18 and having an end 20 extended into the handle 13 and an end 21 extended into the handle 17.

The member 10 is provided with ears 22 and 23 through which the pin 18 extends and the member 14 is provided with similar ears 24 and 25 which are also positioned on the pin 18.

The handles 13 and 17 are channel-shaped in cross section, the handle 13 having an upper flange 26 from which the ear 22 extends and a lower flange 27 from which the ear 23 extends; and the member 14 is provided with an upper flange 28 from which the ear 24 extends and a lower flange 29 from which the ear 25 extends. The outer surface of the handle 13 is provided with serrations 30 and similar serrations 31 are provided on the outer surface of the handle 17.

The extended ends of the members 10 and 14 are provided with triangular-shaped projections, with a projection 32 at the end of the member 10 and a similar projection 33 at the end of the member 14 and, as illustrated in Fig. 2, the end surfaces from the projections 32 and 33 to points 34 and 35 are beveled as illustrated by the lines 36 and 37, respectively. The inner surfaces of the projections are also defined with inclined lines, as indicated by the numerals 38 and 39 and the opposite sides of the wedge-like sections are defined by inclined lines 40 and 41.

The under surface of the member 10 is provided with recesses 42 and similar recesses, as indicated by the numeral 43 are provided in the under surface of the member 14.

In the design illustrated in Figs. 7, 8 and 9 a chock is provided wherein wheel holding members 44 and 45 are connected with an arcuate web 46 and the members are urged to move wedge-like sections 47 and 48 into gripping relation with the peripheral surface of a wheel with a U-shaped spring 49, the ends 50 of which extend outwardly into openings 51 and 52 of the members.

The handles and outer ends of the wheel holding members 44 and 45, of the design illustrated in Figs. 7, 8 and 9 are similar to corresponding parts of the members shown in Figs. 1 to 6 and with handles 53 and 54 thereof gripped between the thumb and fingers of a hand the wedge-shaped portions 47 and 48 may readily be positioned around the wheel or roller, such as the roller 55 of a caster 56 shown in Figs. 2 and 3.

Chocks as illustrated and described herein may be supplied in sets and with a washing machine, cabinet, article of furniture, or the like in a desired position the chocks may be gripped between the thumb and fore finger of a hand and readily positioned around rollers of the casters, as illustrated in Figs. 2 and 3 and upon release of the handle springs snap the wedge-like elements against the peripheries of the rollers, making it impossible for the rollers to move in either direction and thereby retaining the washing machine or other device permanently in position.

It will be understood that modifications, within the scope of the appended claims, may be made in the design and arrangement of the parts without departing from the spirit of the invention.

What is claimed is:

1. A wheel chock comprising a pair of wheel holding members, said members having oppositely inclined converging wheel receiving sections, wedge-shape in cross section on one of the ends thereof and handles extended from the opposite ends, connecting means for said members formed integrally with said members intermediate of said wheel receiving sections and said handles, means extending through said connecting means for pivotally connecting the members in opposed relation to each other and a spring mounted on the pivotal connection of the members and having ends extended into the handles thereof.

2. A chock for wheels of casters and the like comprising a pair of wheel holding members, wedge-shape in cross section and having projections on extended ends, oppositely inclined portions in said members inwardly of said projections in opposed relation to each other, connecting means on said members extending inwardly of said members and integral therewith inwardly of said inclined portions, means extending through said connecting means for pivotally connecting the oppositely inclined portions, handles extended from the oppositely inclined portions beyond the pivotal connections thereof, and spring members mounted on the pivoted connecting means and extended into the handles of the members and connected to said handles to urge the oppositely inclined portions together.

3. In a chock, the combination which comprises a pair of wheel holding members, channel-shape in cross section with oppositely inclined converging roller receiving sections, triangular-shape in cross section and having projections on extended ends and handles extended from the opposite ends, the flanges of the members having ears extended therefrom and the ears being positioned between the triangular-shaped sections of the members and handles, and a pin extended through the ears of the members for pivotally connecting the members together in opposed relation to each other.

4. In a chock, the combination which comprises a pair of wheel holding members, channel-shape in cross section with oppositely inclined converging roller receiving sections, triangular-shape in cross section and having projections on extended ends and handles extended from the opposite ends, the flanges of the members having ears extended therefrom and the ears being positioned between the triangular-shaped sections of the members and handles, a pin extended through the ears of the members for pivotally connecting the members together in opposed relation to each other, and a spring coiled around the pin and having ends extended into the handles of the members for urging the triangular-shaped sections of the members against an object positioned therebetween.

References Cited in the file of this patent

UNITED STATES PATENTS

| | | |
|---|---|---|
| 709,937 | Sturges | Sept. 30, 1902 |
| 1,407,338 | Skiles | Feb. 21, 1922 |
| 2,160,346 | Valentine | May 30, 1939 |
| 2,581,619 | Arrigo | Jan. 8, 1952 |
| 2,720,285 | Taylor | Oct. 11, 1955 |